US012559577B2

(12) United States Patent
Felpin et al.

(10) Patent No.: US 12,559,577 B2

(45) Date of Patent: Feb. 24, 2026

(54) CHEMICAL FUNCTIONALIZATION OF CELLULOSIC MATERIALS WITH DIAZO COMPOUNDS

(71) Applicants: CENTRE NATIONAL DE LA RECHERCHE SCIENTIFIQUE—CNRS -, Paris (FR); NANTES UNIVERSITE, Nantes (FR)

(72) Inventors: François-Xavier Felpin, Nantes (FR); Guillaume Bretel, Pace (FR); Erwan Le Grognec, Lorient (FR); Marie Denis, Nantes (FR); Samuel Calderoni, Nantes (FR)

(73) Assignees: CENTRE NATIONAL DE LA RECHERCHE SCIENTIFIQUE—CNRS-, Paris (FR); NANTES UNIVERSITE, Nantes (FR)

( * ) Notice: Subject to any disclaimer, the term of this patent is extended or adjusted under 35 U.S.C. 154(b) by 604 days.

(21) Appl. No.: 17/926,341

(22) PCT Filed: May 19, 2021

(86) PCT No.: PCT/EP2021/063219

§ 371 (c)(1),
(2) Date: Nov. 18, 2022

(87) PCT Pub. No.: WO2021/233959

PCT Pub. Date: Nov. 25, 2021

(65) Prior Publication Data

US 2023/0183383 A1 Jun. 15, 2023

(30) Foreign Application Priority Data

May 19, 2020 (EP) .................................... 20175498

(51) Int. Cl.
*C08B 11/155* (2006.01)
*C08B 11/04* (2006.01)
(Continued)

(52) U.S. Cl.
CPC ............ *C08B 11/155* (2013.01); *C08B 11/04* (2013.01); *C08B 11/08* (2013.01); *C08B 11/10* (2013.01); *C08B 11/14* (2013.01); *C08B 11/15* (2013.01)

(58) Field of Classification Search
CPC ........ C08B 11/155; C08B 11/14; C08B 11/15
See application file for complete search history.

(56) References Cited

U.S. PATENT DOCUMENTS 2,156,254 A 4/1939 Manchey

FOREIGN PATENT DOCUMENTS

CN 105085955 A 11/2015
WO 2008023179 A2 2/2008

OTHER PUBLICATIONS

Credou et al., "A one-step and biocompatible cellulose functionalization for covalent antibody immobilization on immunoassay membranes" J Mater Chem B vol. 1 pp. 3277-3286, DOI:10.1039/c3tb20380h (Year: 2013).*

(Continued)

*Primary Examiner* — Andrea Olson
(74) *Attorney, Agent, or Firm* — Maier & Maier, PLLC

(57) ABSTRACT

A method for chemically functionalizing a cellulosic material using a diazo compound, and the functionalized cellulosic materials obtained by the method. The cellulosic materials may be functionalized with a functional groups selected from hydrophobic agents, catalyzing agents, sensing agent, diagnostic agents, printing agents chelating agents, ligands, antioxidants, antimicrobial agents, or drugs.

(Continued)

Also, the uses of functionalized cellulosic materials obtained by the method in a variety of applications.

16 Claims, 4 Drawing Sheets

(51) Int. Cl.

| | |
|---|---|
| ***C08B 11/08*** | (2006.01) |
| ***C08B 11/10*** | (2006.01) |
| ***C08B 11/14*** | (2006.01) |
| ***C08B 11/15*** | (2006.01) |

(56) References Cited

OTHER PUBLICATIONS

Pourmoazzen et al., "The morphology, self-assembly, and host-guest properties of cellulose nanocrystals surface grafted with cholesterol" Carbohydrate Polymers vol. 233 article 115840, pp. 1-7, DOI:10.1016/j.carbpol.2020.115840 (Year: 2020).*

Lawoko et al., "Characterization of lignin-carbohydrate complexes from spruce sulfite pulp" Holzforschung vol. 60 pp. 162-165, DOI 10.1515/HF.2006.026 (Year: 2006).*

Ghiassian et al., "Photoinduced Carbene Generation from Diazirine Modified Task Specific Phosphonium Salts to Prepare Robust Hydrophobic Coatings", Langmuir, American Chemical Society, Jul. 27, 2012, vol. 28, 8 pages.

International Search Report and Written Opinion issued on Jul. 28, 2021 in corresponding International Application No. PCT/EP2021/063219; 10 pages.

Pormale et al., "Preparation of Cellulose Ethers by the Action of Diazo Alkanes", Journal of Applied Chemistry of USSR, Consultants Bureau, New York, NY, US, vol. 39, Jan. 1, 1966, 4 pages.

Sitch, "29-the Methylation of Cellulose With Diazomethane, and Some Properties of the Products", Journal of the Textile Institute Transactions, vol. 44, No. 10, Oct. 1, 1953, 13 pages.

* cited by examiner

Cell-4

Cell-5

Saturated fatty acids and related compounds n = 11 : myristic acid
n = 12 : palmitic acid
n = 15: stearic acid 1-adamantanecarboxylic acid

Monoterpenes

L-(-)-menthol (1R)-(-)-myrtenol (S)-(-)perillyl acid

Diterpene abietic acid

Sterol cholesterol

A

B

C

CHEMICAL FUNCTIONALIZATION OF CELLULOSIC MATERIALS WITH DIAZO COMPOUNDS

RELATED APPLICATIONS

The present application is filed pursuant to 35 U.S.C. § 371 as a U.S. National Phase Application of international application No. PCT/EP2021/063219, which was filed on May 19, 2021, claiming the benefit of priority of European Patent Application No. EP 20 175498.3 filed on May 19, 2020. The entire content of each of the aforementioned applications is incorporated herein by reference in its entirety.

BACKGROUND

Cellulose is a polysaccharide consisting of a supramolecular arrangement of linear chains of β(1-4)-linked D-glucose units through a dense network of hydrogen bonds (Hon et al., Cellulose, 1994, 1: 1-25; Isogai, *Material science of cellulose*. Tokyo University Press: Tokyo: 2001, Belgacem & Gandini, *Monomers, polymers and composites from renewable resources*. Elsevier: 2011). Cellulose is the ultimate sustainable biomaterial due to its biocompatibility, low cost, thermal and chemical stability and worldwide availability with an estimated annual bioproduction by the vegetal kingdom of more than $10^{12}$ tons (Klemm et al., Angew. Chem. Int. Ed., 2005, 44: 3358-3393). While fabric and paper are the most important uses thereof in terms of volume, cellulose is also used in the fabrication of high-value materials (Kim et al., Int. J. Precis. Eng. Manuf. Green Technol., 2015, 2: 197-213) with application in catalysis (Koga et al., J. Mater. Chem., 2011, 21: 9356-9361; Koga et al., Molecules, 2015, 20: 1495-1508; Rull-Barrull et al., Angew. Chem. Int. Ed., 2016, 55: 13549-13552) sensing (Rull-Barrull et al., Chem. Commun., 2016, 52: 2525-2528; Rull-Barrull et al., Chem. Commun., 2016, 52: 6569-6572; Wang et al., Biosens. Bioelectron., 2013, 50: 262-268; Xiao et al., RSC Adv., 2013, 3: 5318-5323; Gomes et al., Biosens. Bioelectron, 2015, 65: 54-61), remediation (Gurgel et al., Bioresour. Technol., 2008, 99: 3077-3083; d'Halliun et al., ACS Sustainable Chem. Eng., 2017, 5: 1965-1973; Nongbe et al., Cellulose, 2018, 25: 4043-4055; Aka et al., J. Environ. Sci., 2019, 84: 174-183), self-cleaning materials (Geissler et al., Cellulose, 2014, 21: 357-366; Bongiovanni et al., Colloids and Surfaces A: Physiochem. Eng. Aspects, 2013, 418: 52-59; Bretel et al., ACS Omega, 2018, 3: 9155-9159; Nongbe et al., Cellulose, 2018, 25: 1395-1411), medicine (Cauwel et al., Chem. Commun., 2019, 55: 10158-10161; Jirakittiwut et al., RSC Adv., 2015, 5: 24110-24114; Tischer et al., Biomacromolecules, 2013, 14: 4340-4350; Tischer et al., Adv. Mater., 2014, 26: 4087-4092; Yu et al., Langmuir, 2012, 28: 11265-11273; Wang et al., Chem. Commun., 2015, 51: 11630-11633), and covalent printing (Bretel et al., ACS Omega, 2018, 3: 9155-9159; Rull-Barrull et al., J. Mat. Chem. C, 2017, 5: 5154-5162; Bretel et al., ACS Applied Polymer Materials, 2019, 1: 1240-1250).

The chemical functionalization of hydroxyl groups on glucose units of cellulose is an important requirement to prepare original materials with physical properties distinct from pristine cellulose (Luo et al., Sci. China Chem., 2014, 57: 1672-1682; Roy et al., Chem. Soc. Rev., 2009, 38: 2046-2064; Malmström et al., Polym. Chem., 2012, 3: 1702-1713). Functionalizing pristine cellulose through chemical synthesis is not trivial as the dense hydrogen bond network strongly affects both the reactivity of hydroxyl groups and the solubility properties in water and most organic solvents. Cellulose pulp and cellulose powder can be solubilized in tailored media associating a polymer solvent (dimethylformamide (DMF), dimethylacetamide (DMA), or dimethylsulfoxide (DMSO)) with a dissolved salt (lithium chloride (LiCl) or tetra-n-butylammonium fluoride (TBAF)) (Liebert et al., Biomacromolecules, 2005, 6: 333-340). Alternatively, the use of ionic liquid has also been described to efficiently dissolve cellulose (Hufendiek et al., Biomacromolecules, 2014, 15: 2563-2572; Schenzel et al., Green Chem., 2014, 16: 3266-3271). The use of these specific solvents allows to partially break the hydrogen bond network, to increase the reactivity of hydroxyl groups and thus to facilitate chemical functionalization. Functionalizing cellulose paper and fabric is even more difficult as the inherent inertness of cellulose is amplified by the bulk nature of these materials due to mass transfer limitations and the use of dissolving media is prohibited, otherwise the physical integrity of the materials would be destroyed. The direct chemical functionalization of bulk cellulose (paper and fabric) mainly relies on esterification (Geissler et al., Cellulose, 2014, 21: 357-366; Hansson et al., ACS Appl. Mater. Interfaces, 2009, 1: 2651-2659; Carlsson et al., Polym. Chem., 2012, 3: 727-733; Lee et al., Bull. Korean Chem. Soc., 2014, 35: 1545-1548) and silanization (Yang et al., Colloid Interface Sci., 2008, 325: 588-593; Wang et al., PloS One, 2016, 11) processes of C6-alcohols. While the simplicity of execution and the satisfactory degree of substitution (>10%) generally obtained are the main assets of these approaches, they are poorly time efficient and the corresponding ester or siloxane linkage suffers from a modest stability in hydrolytic conditions. The later shortcoming can be addressed through tosylation of C6-alcohols following by displacement of the tosylate groups with amines or azide anions. This approach allows the creation of stable C—N bonds but requires at least two chemical steps (Nongbe et al., Cellulose, 2018, 25: 1395-1411).

Therefore, there remains a need in the art for chemical functionalization strategies of bulk cellulose that are compatible with industrial settings.

SUMMARY

The present Inventors have identified a new approach for efficiently functionalizing cellulose in the form of paper or fabric using diazo compounds. Compared to known traditional methods, the proposed functionalization reaction takes place in a single step and allows for a rapid grafting via a covalent ether bond which is resistant to hydrolysis conditions. Thus, the reaction is compatible with industrial production rates, and is also respectful of the environment as nitrogen ($N_2$) is the only released by-product. In terms of grafting levels, the reaction may be performed as efficiently in the presence of a rhodium catalyst or of photochemical activation than in the absence of any catalysis or light activation.

Consequently, the present invention provides a method for functionalizing a cellulosic material, comprising a step of: contacting said cellulosic material with a diazo compound to obtain a functionalized cellulosic material. The cellulosic material is generally a mercerized cellulosic material.

In certain embodiments, the functionalization takes place via formation of an ether linkage.

In certain embodiments, the cellulosic material used m the functionalization method is in the form of fabric, paper or cardboard.

In certain embodiments, the cellulosic material comprises pristine cellulose. In certain embodiments, the cellulosic material consists of pristine cellulose.

In certain embodiments, the diazo compound used in the functionalization method is stabilized by at least one electron-withdrawing group.

In certain particular embodiments, the diazo compound stabilized with at least one electron-withdrawing group has one of the following formula:

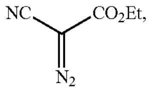

1

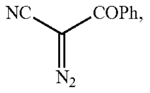

2

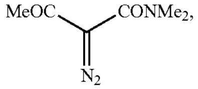

3

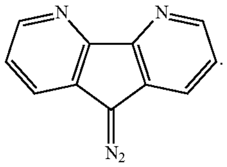

4

In certain embodiments, the functionalization takes place in a solvent selected from the group consisting of non-polar solvents, polar aprotic solvent, and any combination thereof.

In certain embodiments, the functionalization takes place at a temperature comprised between room temperature and reflux temperature.

In certain embodiments, the functionalization takes place in the presence of a rhodium (II) carboxylate used as catalyst or in the presence of a photochemical activation, for example photochemical activation with UV light.

In other embodiments, the functionalization takes place in the absence of a catalyst and in the absence of any photochemical activation.

The present invention also relates to the use of a method as described herein for functionalizing a cellulosic material with a functional group selected from the group consisting of: hydrophobic agents, catalyzing agents, sensing agents, diagnostic agents, printing agents, chelating agents, ligands, antioxidants, antimicrobial agents, and drugs.

In certain embodiments, the hydrophobic agent belongs to the family of saturated fatty acids and related compounds, the family of diterpenes or the family of sterols.

In certain particular embodiments, the hydrophobic agent is selected from the group consisting of cholesterol, palmitic acid and abietic acid.

The present invention further relates to the use of a method as described herein for the fabrication of one of: a hydrophobic cellulosic material, a packaging material, a cellulose-supported catalyst or a security element.

The present invention also relates to a functionalized cellulosic material obtained using a method as described herein.

The present invention further relates to the use of such a functionalized cellulosic material in packaging, in catalysis, in filtration, adsorption and water treatment, in remediation, in medicine, in anti-counterfeiting, in paper-based electronics or in the fabrication of clothes, protective garments, health-care materials, medical devices, fiduciary items, official documents, or identifiers.

These and other objects, advantages and features of the present invention will become apparent to those of ordinary skill in the art having read the following detailed description of the preferred embodiments.

DEFINITIONS

Figure 1:
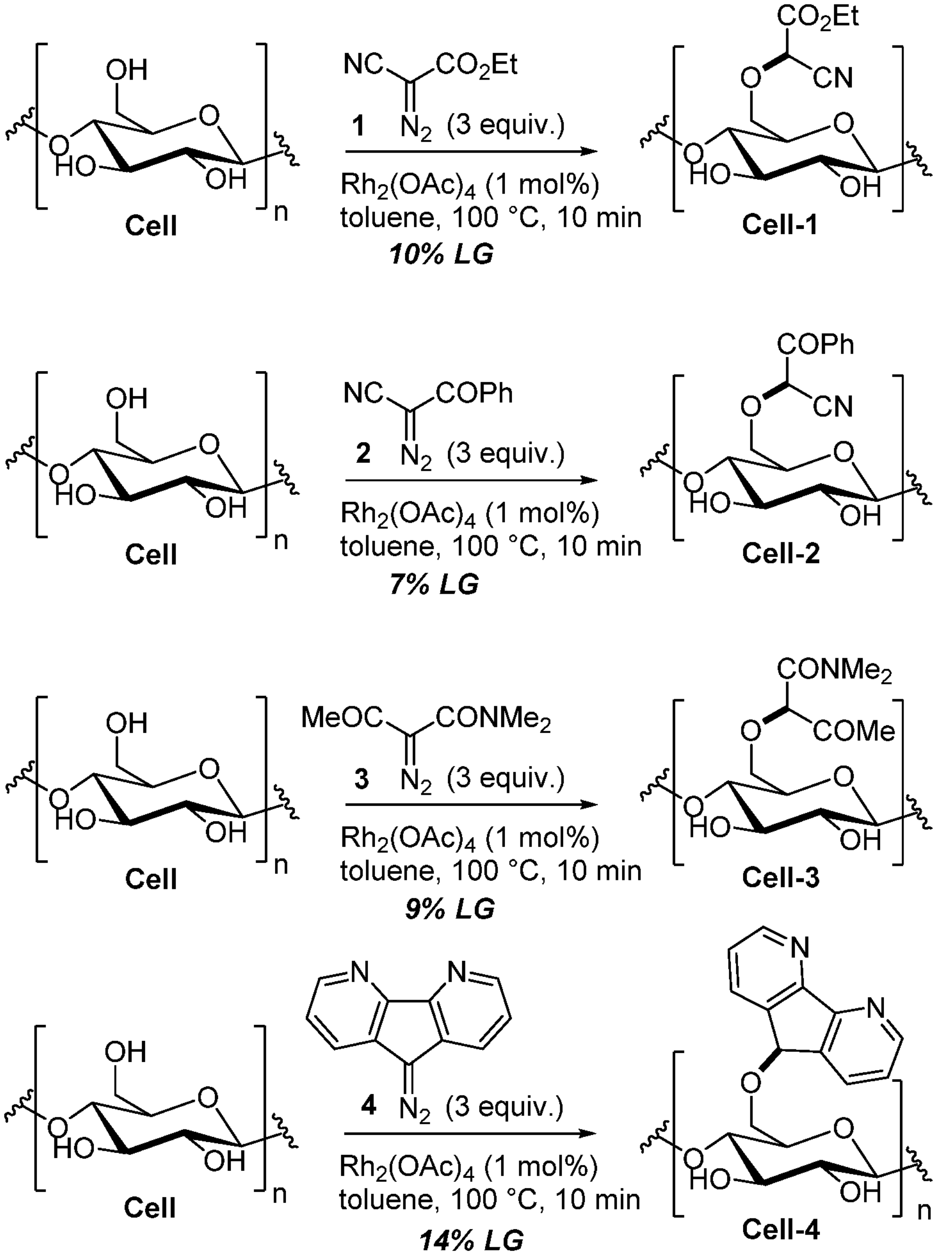
FIG. 1. Grafting reaction of 4 different diazo compounds on cellulose.

Throughout the specification, several terms are employed that are defined in the following paragraphs.

The term "acyl", as used herein, refers to a —C(=O)R (or —COR) group, wherein R is selected from alkyl, cycloalkyl, alkenyl, cycloalkenyl, alkynyl, cycloalkynyl, aryl, or heterocyclic group, and wherein the alkyl, cycloalkyl, alkenyl, cycloalkenyl, alkynyl, cycloalkynyl, aryl, or heterocyclic group may optionally be substituted.

The term "aldehyde", as used herein, refers to a —C(=O)H group.

The terms "amide" and "amido" are used herein interchangeably, and refer to —C(=O)NRR', wherein R and R' are each independently selected from hydrogen, alkyl, cycloalkyl, alkenyl, cycloalkenyl, alkynyl, cycloalkynyl, aryl, or heterocyclic group, and wherein the alkyl, cycloalkyl, alkenyl, cycloalkenyl, alkynyl, cycloalkynyl, aryl, or heterocyclic group may optionally be substituted.

The term "ester", as used herein, refers to a —C(=O)—OR group, wherein R is selected from hydrogen, alkyl, cycloalkyl, alkenyl, cycloalkenyl, alkynyl, cycloalkynyl, aryl, or heterocyclic group, and wherein the alkyl, cycloalkyl, alkenyl, cycloalkenyl, alkynyl, cycloalkynyl, aryl, or heterocyclic group can be substituted or unsubstituted.

The term "nitrile", as used herein, refers to the —C≡N group.

The term "nitro", as used herein, refers to the $—NO_2$ group.

The term "sulfonyl", as used herein, refers to a $—S(=O)_2—R$ group, wherein R is selected from hydrogen, alkyl, cycloalkyl, alkenyl, cycloalkenyl, alkynyl, cycloalkynyl, aryl, or heterocyclic group, and wherein the alkyl, cycloalkyl, alkenyl, cycloalkenyl, alkynyl, cycloalkynyl, aryl, or heterocyclic group may optionally be substituted.

The term "aryl", as used herein, refers to an aromatic ring or ring system consisting of one or more rings, preferably one to three rings, fused or unfused, with the ring atoms consisting entirely of carbon atoms. Examples of aryl groups include phenyl, biphenyl, naphthyl, phenanthryl, anthryl, indyl, and the like. The aryl group can be substituted or unsubstituted.

The term "alkyl", as used herein, described a saturated aliphatic hydrocarbon including straight chain and branched chain groups. Preferably, the alkyl group has 1 to 20 carbon atoms. Whenever a numerical range, e.g., "1-20" is stated herein, it implies that the group, in this case an alkyl group, may contain 1 carbon atom, 2 carbon atoms, 3 carbon atoms, etc., up to and including 20 carbon atoms. In certain embodiments, the alkyl group is a medium size alkyl having 1 to 10 carbon atoms. Examples of alkyl groups include methyl, ethyl, propyl, isopropyl, butyl, isobutyl, sec-butyl, tert-butyl, pentyl, isopentyl, hexyl, heptyl, octyl, nonyl, decyl, etc. The alkyl group may be substituted or unsubstituted.

The term "cycloalkyl", as used herein, describes an all-carbon monocyclic or fused ring (i.e., rings which share an adjacent pair of carbon atoms) group where one ring (or more) does not have a completely conjugated π-electron system. Saturated monocyclic cycloalkyl rings include, for example, cyclopropyl, cyclobutyl, cyclopentyl, cyclohexyl, and cyclooctyl. Saturated bicyclic and polycyclic cycloalkyl rings include, for example, norbomane, bicyclo[2.2.2]octane, decahydronaphthalene and adamantane. The cycloalkyl group may be substituted or unsubstituted.

The term "alkenyl", as used herein, means a straight or branched hydrocarbon group of 2 to 20 carbon atoms containing at least one carbon-carbon double bond (—C═C). Examples of alkenyl groups include ethenyl, n-propenyl, isopropenyl, n-butenyl, isobutenyl, t-butenyl, octenyl, decenyl, tetradecenyl, hexadecenyl, eicosenyl, tetracosenyl and the like. The alkenyl group may be substituted or unsubstituted.

The term "cycloalkenyl", as used herein, refers to an unsaturated cyclic hydrocarbonyl group having at least one carbon-carbon double bond. A cycloalkenyl group may be monocyclic (C3-C10) or multicyclic (for example fused, spiro or bridged bicyclic ($C_5$-$C_{12}$)).

Examples of cycloalkenyls include, but are not limited to cyclopropenyl, cyclobutenyl, cyclohexenyl, 1,3 or 1,4 cyclooctadienyl, cycloheptenyl, cycloheptadienyl, cyclooctenyl, bicyclooctenyl, and the like. The cycloalkenyl group may be substituted or unsubstituted/The term "alkynyl", as used herein, refers to either a straight or branched C1-C20 hydrocarbon having at least two carbon atoms linked by a triple bond (—C≡C—).

Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatriynyl. The alkynyl group may be substituted or unsubstituted.

The term "cycloalkynyl", as used herein, refers to a non-aromatic carbon-based ring composed of at least seven carbon atoms and containing at least one carbon-carbon triple bond. Examples of cycloalkynyl groups include, but are not limited to, cycloheptynyl, cyclooctynyl, cyclononynyl, and the like. The cycloalkynyl group may be substituted or unsubstituted.

As used herein, the term "heterocyclic" refers to a cyclic group containing at least one sulfur, nitrogen or oxygen ring atom. A heterocyclic group may be a heterocycloalkyl, heterocycloalkenyl, heterocycloalkynyl, or heteroaryl group. Examples of heterocyclic groups include, but are not limited to, furyl, thienyl, pyrazolyl, pyrrolyl, methylpyrrolyl, imidazolyl, indolyl, thiazolyl, oxazolyl, isothiazolyl, isoxazolyl, piperidyl, pyrrolinyl, piperazinyl, quinolyl, triazolyl, pyrrolidinyl, furazanyl, N-metylindolyl, methylfuryl, pyridazinyl, pyrimidinyl, pyrazinyl, pyridyl, epoxy, aziridino, oxetanyl, azetidinyl, N-oxides of pyridyl, pyrazinyl, and pyrimidinyl and the like.

The term "substituted", when used herein to characterize a chemical group, indicates that the chemical group can have one or more hydrogen atoms replaced by a non-hydrogen substituent. In the context of the present invention, a chemical group (e.g., aryl, alkyl, cycloalkyl, alkenyl, cycloalkenyl, alkynyl, cycloalkynyl, aryl, or heterocyclic group) is substituted to the extent that such substitution makes sense chemically. Examples of substituents include, but are not limited to, nitro (—$NO_2$), sulfonyl, cyano, halogen (F, Br, Cl, I), alkyl, amino (—NR'R", wherein each of R' and R" is independently H, an alkyl group, a cycloalkyl group or a heteroaryl group), hydroxy (—OH), alkoxy (—OR', wherein R' is an alkyl group), aryloxy (—OAr, wherein Ar is an aryl group), aldehyde (—C(═O)H), acyl, ester, alkylthio (—SR', wherein R' is an alkyl group), arylthiol (—SAr, wherein Ar is an aryl group), carboxy (—COOH or —COOM, wherein M is a suitable cation, such as sodium or potassium), amido (—C(═O)NR'R", or —NR'—C(═O)R", wherein each of R' and R" is independently H, an alkyl group, a cycloalkyl group or a heteroaryl group), oxo (0=), alkylsilyl (—SiR'R"R"', wherein each of R', R" and R"' is an alkyl group), and the like.

The terms "approximately" and "about", as used in the present document, m reference to a number, generally include numbers that fall within a range of 10% in either direction of the number (greater than or less than the number) unless otherwise stated or otherwise evidenced from the context (except where such number would exceed 100% of a possible value).

DETAILED DESCRIPTION

As mentioned above, the present invention relates to a method for functionalizing a cellulosic material using a diazo compound, to functionalized cellulosic materials synthesized using such a method and to the use of functionalized cellulosic materials thus obtained in a variety of applications.

I—Functionalization of Cellulosic Material

A method for functionalizing a cellulosic material according to the present invention comprises a step of contacting the cellulosic material with a diazo compound to produce a functionalized cellulosic material. As used herein, the term "functionalization" relates to the modification of a solid substrate to provide a plurality of functional groups on the substrate surface. By "functionalized" surface, as used herein, is meant a substrate surface that has been modified so that a plurality of functional groups is present thereon. Preferably, functionalization refers to the addition of functional groups on the surface of a solid support for the purpose of modifying or improving its properties. Some of these properties can be hydrophobicity, antioxidant and/or bacteriostatic capacity, high mechanical strengths, etc. (see below).

1. Cellulosic Material

The material to be functionalized according to a method of the present invention is a cellulosic material. As used herein, the term "cellulosic material" refers to a solid support containing cellulose, optionally in admixture with other substances.

Cellulose is a polysaccharide with the formula $(C_6H_{10}O_5)_n$ consisting of a linear chain of several hundreds to many thousands of β(1→4) linked D-glucose units. In the formula, the number n of D-glucose units essentially depends on the type of cellulose and/or cellulosic material used and is typically comprised between 15 and 15,000. The cellulose composing a cellulosic material used in a functionalization method described herein may be derived from any suitable source known in the art, including from wood (e.g., from wood of softwood trees such as spruce, fir, larch, or pine, or from wood of hardwood trees such as birch, aspen, poplar, ebony, alder, eucalyptus or acacia, or from a mixture of softwoods and hardwoods), from agricultural residues, grasses or other plant substances (e.g., from straw, leaves, bark, seeds, hulls, flowers, vegetables or fruits from cotton, flax, corn, wheat, oat, rye, barley, rice, flax, hemp, jute, ramie, kenaf, bagasse, bamboo or reed), or yet from algae, fungi or bacteria.

A cellulosic material used in a method of functionalization described herein is a solid support. The terms "solid support", "solid substrate", "support" and "substrate" are used herein interchangeably. They refer to a material having a rigid, semi-rigid or flexible surface or surfaces. A solid support may be porous or non-porous. A solid support may optionally be capable of taking up a liquid (e.g., due to porosity), but will typically be sufficiently rigid that it does not swell substantially when taking up the liquid and does not contract substantially when the liquid is removed by drying. A non-porous solid support is generally impermeable to liquids or gases.

In particular, a functionalization method according to the present invention can be applied to a cellulosic material in the form of fabric, of paper or of cardboard.

As used herein, the term "fabric" refers to any woven, non-woven, knitted, felted, tufted, knotted, crocheted or otherwise formed sheet-like structure that is produced from, or in combination with, any natural or manufactured fiber, yarn or substitute thereof. A fabric may be a textile, a cloth, fabric material, fabric clothing, or another fabric product. The terms "fiber" and "textilefiber" are used herein interchangeably and refer to a unit of matter which is capable of being spun into a yarn or made into fabric by bonding or by interlacing in a variety of ways include, for example, weaving, knitting, braiding, felting, twisting, webbing, knotting or crocheting. Fibers are fine substances with a high ratio of length to thickness. As used herein, the term "yarn" refers to a continuous strand of textile fibers that may be composed of endless filaments or shorter fibers twisted or otherwise held together, and that are in a form suitable for weaving, knitting, braiding, felting, twisting, webbing or otherwise fabricating into a fabric. In the context of the present invention, in addition to cellulose (e.g., hemp, linen, cotton, ramie, jute, and sisal), a fabric may further comprise natural or synthetic fibers selected from the group consisting of wool, silk, thermoplastic aliphatic polymers, polyesters, polyamides, polyimides, polypropylene, polyethylene, polystyrene, polytetrafluoroethylene, fiberglass, polytrimethylene, polycarbonates. polyester terephthalate, polybutylene terephthalate and any combination thereof.

As used herein, the term "paper" relates to sheets or rolls produced from cellulose fibers, optionally in combination with other fibrous matter such as ceramic fibers, glass fibers, slag fibers, carbon fibers, polyamide fibers, viscose fibers, and mineral fibers. The resulting thin web has measurements in the two dimensions of width and length which are greater by many orders of magnitude than the third dimension of thickness. The paper will typically have a thickness of 0.1-0.3 mm. The basis weight (or grammage) of the paper may be comprised between 20 and 120 $g/m^2$.

The term "cardboard" is a generic term for heavy-duty paper-based products having greater thickness and superior durability or other specific mechanical attributes to paper, such as foldability, rigidity and impact resistance. "Cardboard" includes pasteboard, paperboard, and corrugated fiberboard. The terms "pasteboard", "card stock", and "cover stock" are used herein interchangeably and refer to a paper stock that is thicker and more durable than normal writing or printing paper, but thinner and more flexible than other forms of paperboard. Pasteboard is often used for business cards, postcards, playing cards, catalogue covers, scrapbooking, and other uses which require higher durability than regular paper. A typical basis weight of pasteboard is between 135 and 300 $g/m^2$. As used herein, the term "paperboard" refers to a thick paper-based material with a thickness of over 0.30 mm, which exhibits higher foldability and rigidity than paper. Paperboard is often defined as a paper material of sufficient thickness to be shape-retaining when formed into a tube and is often used for folding cartons, set-up boxes, carded packaging, etc. It generally has a grammage above 250 $g/m^2$.

Paperboard can be single- or multi-ply. The terms "corrugated fiberboard" and "corrugated cardboard" are used herein interchangeably and refer to a combination of paperboards usually composed of two flat liners and one inner fluted corrugated medium. It is often used for making boxes for shipping or storing products.

In certain embodiments, the cellulose in the cellulosic material to be functionalized according to a method described herein is pristine cellulose. As used herein, the term "pristine cellulose" refers to cellulose that has not been submitted to any treatment resulting in a modification of its chemical formula.

In other embodiments, the cellulose in the cellulosic material may be partially chemically derivatized by, for example, carboxylation, oxidation, esterification, or any other suitable reaction as long as the chemical modification does not introduce a group that reacts with diazo compounds or that prevents a hydroxyl group of cellulose to react with diazo compounds. The term "partially chemically derivatized", when used herein to characterize cellulose, refers to a cellulose that contains D-glucose units with at least one hydroxyl group that has not been affected by the derivatization, including, for example, cellulose acetate (which is one of the earliest synthetic fibers), cellulose sulfate, carboxymethyl cellulose, or methyl cellulose.

Prior to functionalization, the cellulosic material is submitted to a mercerization step. The term "mercerization", as used herein, has its art understood meaning and refers to a process of treating the cellulosic material with alkali. In mercerized cellulose, the intra- and inter-molecular hydrogen bonds are broken, thus mercerization modifies the macroscopic structure of cellulose. The step of mercerization may be performed using any mercerization method known in the art, including standard mercerization, which is carried out for 24 hours in a solution of 10% by mass of NaOH at room temperature, or express mercerization, which is carried out by depositing a solution of 10% by mass of NaOH on the cellulosic material for 15 minutes at room temperature. The mercerization step is generally followed by washing of the mercerized cellulosic material obtained (for example with ethanol) until a neutral pH is obtained.

2. Diazo Compounds

The reagent in a functionalization reaction described herein is a diazo compound.

The terms "diazo" and "diazo compound" are used herein interchangeably. They refer to a class of highly reactive compounds with general formula: $R^1R^2C{=}N_2$. In the context of the present invention, diazo compounds suitable for use in a functionalization method described herein are diazo compounds which, as carbene equivalents, are prone to insert into C—H and X—H bonds (where X is Si, N, S or 0). Such suitable diazo compounds include diazo compounds stabilized by electron-withdrawing substituents.

The term "electron-withdrawing", as used herein to characterize a group or substituent, has its art understood meaning and denotes the tendency of a group or substituent to attract valence electrons from neighboring atoms, i.e., the substituent is electronegative with respect to neighboring atoms.

Diazo compounds stabilized by electron-withdrawing substituents include diazo compounds of general formula $R^1R^2C{=}N_2$, wherein $R^1$ and $R^2$ are substituents independently selected from acyl, aldehyde, amide, ester, nitrile, nitro, sulfonyl and aryl groups, as defined above or wherein Rand $R^2$ join to form an aryl group, or wherein $R^1$ is selected from acyl, aldehyde, amide, ester, nitrile, nitro, sulfonyl and aryl groups and $R^2$ is hydrogen or an alkyl group (in particular a linear, branched, cyclic or polycyclicalkyl group comprising 12 carbon atoms or less).

Diazo compounds used in methods of functionalization according to the present invention may be obtained from commercial sources or alternatively may be prepared using procedures that are known in the art.

For example, diazo compounds can be prepared from alpha-acceptor-substituted primary aliphatic amines ($Ra-CH_2-NH_2$, wherein Ra is COOR, CN, CHO or COR), which react with nitrous acid to generate diazo compounds. Diazo compounds may alternatively be formed by an electrophilic substitution reaction between an acyl halide and diazomethane. Ketones (including 1,3-diketones), esters (including β-keto esters), acyl chlorides and carboxylic acids can be converted to diazo compounds employing diazo transfer conditions with a suitable transfer reagent (e.g., aromatic and aliphatic sulfonyl azides, such as toluenesulfonyl azide, 4-carboxyphenylsulfonyl azide, 2-naphthalenesulfonyl azide, methylsulfonyl azide and the like) and a suitable base (e.g., triethylamine, triisopropylamine, diazobicyclo[2.2.2]octane, 1,8-diazabicyclo-[5.4.0]undec-7-ene, and the like) (Davies, J. Am. Chem. Soc. 1993, 115, 9468-9479). Alternatively, a diazo compound can be formed from an aliphatic amine, an aniline or other arylamine, or a hydrazine using a nitrosating agent (e.g., sodium nitrite) and an acid (e.g., p-toluenesulfonic acid) (Zollinger, Diazo Chemistry I and II, VDH Weinheim, 1994). Diazo compounds can also be obtained through an elimination reaction of N-alkyl-N-nitroso compounds ("Organic Syntheses", 1988, Vol. 6, 981), or from azide and hydrazine precursors (Myers and Raines, Angew. Chem. Int. Ed., 2009, 48: 2359-2363). Alternatively, alkylnitrile reagents (e.g., (3-methylbutyl)nitrile)) can be used to convert α-aminoesters to the corresponding diazo compounds in non-aqueous media (Takamura, Tetrahedron, 1975, 31: 227). One skilled in the art will recognize that the method of preparation of the diazo compound is not a limiting factor. Following preparation, if desired or if necessary, a diazo compound may be purified prior to being used in a functionalization method described herein. Purification methods of diazo compounds are known in the art.

3. Reaction of Functionalization

A method for functionalizing a cellulosic material according to the present invention comprises a step of contacting a cellulosic material with a diazo compound to produce a functionalized cellulosic material. As indicated above, prior to functionalization, the cellulosic material is submitted to a mercerization step. In other words, in a method for functionalizing a cellulosic material according to the present invention, the cellulosic material is a mercerized cellulosic material (i.e., a cellulosic material, which has been subjected to mercerization)—the term "mercerized" is however often omitted below. Thus, a method for functionalizing a cellulosic material.

The step of contacting is carried out under conditions (e.g., temperature, time, solvent) that allow reaction of the diazo compound with the cellulosic material according to the following reaction, which is shown in the case of pristine cellulose:

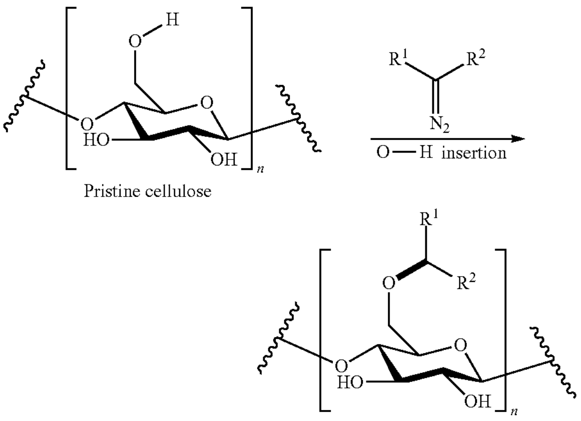

Pristine cellulose
Grafted cellulose

The functionalization takes place via the formation of an ether linkage. The terms "ether linkage" and "ether bond" are used herein interchangeably, and refer to a chemical linkage of two substituted or unsubstituted groups through an oxygen atom i.e., R—O—R', such that neither R nor R' contain another oxygen atom attached directly to the carbon atom that forms the ether bond. In other words, the ether linkage is not part of an acetal, ketal, glycosidic, ester or orthoester moiety.

A functionalization method according to the present invention is a heterogeneous chemical reaction. As used herein, the term "heterogeneous chemical reaction" refers to a class of chemical reactions in which the reactants are components of two or more phases (here solid (the cellulosic material) and liquid (the diazo compound dissolved in a solvent or the diazo compound, as such, if it is liquid in the reaction conditions)).

The term "contacting", as used herein, is intended to mean bringing together at least two distinct species by dissolving, mixing, suspending, blending, impregnating, immersing, adsorbing, or stirring such that the at least two distinct species can react. In the context of the present invention, the cellulosic material and the diazo compound are brought into contact in a solvent. For example, as reported in the Examples section below, the cellulosic material may be immersed in a solution of the diazo compound dissolved in a solvent.

A. Solvent

In a functionalization reaction according to the present invention, the solvent is selected for its ability to dissolve the diazo compound. As will be acknowledged by one skilled in the art, a solvent may be a single solvent or a mixture of at least two different solvents. Generally, the solvent is an organic solvent, preferably selected among non-polar solvents, polar aprotic solvents, and combinations thereof. Examples of non-polar solvents include, but are not limited to, pentane, cyclopentane, hexane, cyclohexane, benzene, toluene, 1,4-dioxane, chloroform, diethyl ether, dichloromethane and dichloroethane. Examples of polar aprotic solvents include, but are not limited to, tetrahydrofuran, ethyl acetate, acetone, dimethylformamide, acetonitrile, and dimethylsulfoxide. One skilled in the art knows how to select a suitable solvent or solvent mixture to optimize a reaction depending on the nature of the diazo compound and cellulosic material used as reagents.

B. Temperature

A functionalization reaction described herein may be carried out at any suitable temperature, i.e., a temperature that allows a reaction to take place between the reagents. Under the conditions used in the experiments reported in the Examples section below, the present Inventors have observed that grafting occurred slightly better at reflux than at room temperature irrespective of the solvent used. Thus, functionalization reactions according to the present invention are preferably carried out at temperatures ranging from room temperature to reflux temperature.

In certain embodiments, the functionalization reaction is carried out at room temperature. As used herein, the term "room temperature" refers to a temperature between about 15° C. and about 35° C., for example, between about 20° C. and about 35° C.

Thus, room temperature may be about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., or about 35° C.

In other embodiments, the functionalization reaction is carried out at reflux temperature. As used herein, the term "reflux temperature" refers to the temperature at which the solvent or solvent system refluxes or boils at atmospheric pressure.

In yet other embodiments, the functionalization reaction is carried out at a temperature that is higher than room temperature but lower than reflux temperature. For example, the functionalization reaction may be carried out at a temperature comprised between room temperature and 40° C. when the solvent is dichloromethane; between room temperature and 80° C. when the solvent used is dichloroethane; between room temperature and 100° C. when the solvent is toluene, etc.

C. Ratio

A functionalization reaction according to the present invention may be performed using any molar ratio between the diazo compound and cellulosic material that allows for efficient functionalization of the cellulosic material. One skilled in the art knows how to select such a molar ratio to optimize the functionalization reaction.

Under the conditions used in the experiments reported in the Examples section below, the present Inventors have observed that the grafting efficiency did not vary much when the number of equivalents of diazo compound per glucose unit (present in the cellulosic material) was varied from 1 to 9.

Thus, in certain embodiments, the number of equivalents of diazo compound per glucose unit (present in the cellulosic material) is comprised between about 1 and about 30, preferably between about 1 and about 15, or between about 1 and about 10. For example, the number of equivalents of diazo compound per glucose unit (present in the cellulosic material) may be about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, or about 10.

D. Catalysis, Photochemical Activation

In certain embodiments, the functionalization reaction is carried out in the presence of a catalyst. The terms "catalyst" and "catalyzing agent" are used herein interchangeably and refer to a material that promotes a reaction. In the context of the present invention, the catalyst is a rhodium (II) carboxylate. Examples of rhodium(II) carboxylates that can be used as catalysts in the functionalization reaction include, but are not limited to, rhodium(II) acetate ($Rh_2(OC({=}O)CH_3)_4$ or $Rh_2(OAc)_4$), rhodium(II) propionate ($Rh_2(OC({=}O)CH_2CH_3)_4$), rhodium(II) butyrate ($Rh_2(OC({=}O)CH_2CH_2CH_3)_4$), and the like. In certain preferred embodiments, the catalyst used is rhodium(II) acetate. The rhodium (II) carboxylate catalyst is used at a concentration that is sufficient to catalyze the functionalization reaction. One skilled in the art knows how to determine such a concentration. For example, the concentration of rhodium(II) carboxylate may be comprised between about 0.1 mol % and about 4 mol %, for example between about 0.5 mol % and about 2 mol %, for example about 1 mol %. The unit "mole percent (mol %)" is the amount of the catalyst (expressed in moles) divided by the total amount of glucose units (also expressed in moles) expressed in %.

In other embodiments, the functionalization reaction is carried out in the absence of a catalyst but in the presence of a photochemical activation. The photochemical activation is performed with a light source emitting in the ultraviolet (UV). As used herein, the term "UV light" relates to radiation with a wavelength or a peak wavelength between about 200 nm and about 400 nm. In the context of the present invention, photochemical activation may be carried out using any UV light emitting device known in the art, including lamps, light emitting diodes (LEDs), lasers, and the like. The light source may be of a specific wavelength (for instance, in the Examples presented below, the Inventors have used 254 nm and 365 nm), or alternatively, the light source may emit a broad spectrum including UV radiation (for example, the Inventors have used a Xenon lamp, which emits from the UV to the infrared (IR). Photochemical activation is generally performed for the duration of the functionalization reaction. However, it is also envisioned that photochemical activation could be performed for a shorter time that the entire duration of the functionalization reaction.

In yet other embodiments, the functionalization reaction is carried out in the absence of a catalyst and in the absence of photochemical activation. As already mentioned above, the present Inventors have shown that, in terms of grafting levels, the functionalization reaction described herein may be performed efficiently in the presence of a rhodium catalyst or in the presence of photochemical activation or yet in the absence of any catalysis or light activation.

E. Reaction Time

The functionalization reaction can be conducted for any suitable length of time. In general, the reaction mixture is carried out for anywhere between several seconds to several hours. Depending on the experimental conditions, the preparation scale, and the nature of the cellulosic material and diazo compound used, the reaction can be conducted, for example, for about 10 seconds, or about 30 seconds, or about 1 minute, or about 2 minutes, or about 3 minutes, or about 4 minutes, or about 5 minutes, or about 10 minutes, or about 15 minutes, or about 30 minutes, or about 45 minutes, or about 1 hour, or about 2 hours, or about 4 hours, or about 5 hours, or more than 5 hours.

F. Reaction Workup

After completion of the reaction, the functionalized cellulosic material may be washed with an organic solvent to remove any unreacted diazo compound and any residual rhodium-based catalyst (if a catalyst is used in the functionalization reaction). Washing may be performed in one or multiple stages using any method known in the art, for example by immersing the functionalized cellulosic material in one or several baths, or by using a washing device such as a rotary washing device or an ultrasonic bath for example if the synthesis is performed in an industrial setting.

Following the washing step, the functionalized cellulosic material may be dried using any suitable method, for example by drying using a gas flow (for example air, argon, nitrogen) or by passing heated air through the cellulosic material, for example using a tumble dryer, or a steam tube dryer, or by infrared irradiation, for example using an infrared drier, or yet by heating, for example using a conduction dryer or a convection dryer.

G. Degree of Functionalization

A functionalized cellulosic material obtained using a method described herein may be analyzed to determine the degree of functionalization. The terms "degree of functionalization" and "level of grafting" are used herein interchangeably, they refer to the proportion of hydroxyl groups (of D-glucose units of the cellulose) that have reacted with a diazo compound in the functionalization reaction. Accordingly, the degree of functionalization or the degree of etherification can be determined via the measurement of the number of hydroxyl groups of the cellulosic material prior to the functionalization reaction and after the functionalization reaction. Elemental analysis may be used for such a determination.

The degree of functionalization of the cellulosic material according to a method described herein can vary from about 1% to about 50%, preferably from about 1% to about 33%, in particular from about 5% to about 15%, for example about 5%, about 6%, about 7%, about 8%, about 9%, about 10%, about 11%, about 12%, about 13%, about 14%, or about 15%.

H. Further Modifications

In certain embodiments, the functionalization method described herein allows the cellulosic material to be functionalized with the desired functional group, i.e., the functional group or molecule of interest whose presence on the surface of the cellulosic material is intended to modify or improve at least one property of the cellulosic material. In other words, in such embodiments, the diazo compound bears the desired functional group (for example, $R^1$, or $R^2$, or $R^1$ and $R^2$ is/are the desired functional group); the final functionalized cellulosic material is obtained in a single step; and the desired functional group is directly attached to the cellulosic material via an ether linkage. The diazo compound bearing the functional group may be commercially available, or alternatively one can first prepare a diazo derivative of the molecule of interest to be grafted on the cellulosic material (e.g., the molecule of interest or desired functional group may be selected from hydrophobic agents, biomolecules, drugs, analytes, catalyzing agents, diagnostic agents, printing agents, sensing agents, and the like—see below).

In other embodiments, the functionalization method described herein allows the cellulosic material to be functionalized with a reactive moiety that allows subsequent functionalization with the desired functional group (i.e., molecule of interest). As used herein, the term "reactive moiety" refers to a chemical group that can be used as the starting point to a synthetic organic process. As will be recognized by one skilled in the art, a reactive moiety may be protected, at least temporarily. In the context of the present invention, examples of suitable reactive moieties include, but are not limited to, ketones, nitriles, esters and amides. In other words, in such embodiments, the diazo compound does not bear the desired functional group; and the final functionalized cellulosic material is obtained in a multi-step reaction. One skilled in the art knows how to select experimental conditions to covalently bind the desired functional group to a cellulosic material via the reactive moieties present onto the cellulosic material. This synthetic approach is particularly useful when a diazo compound of the molecule of interest cannot be easily prepared or when steric effects dictate a physical distance between the cellulosic material surface and the functional group. Thus, in certain embodiments, a diazo compound may be selected to introduce a spacer between the cellulosic material and the functional group of interest. For example, at least one of $R_1$ and $R_2$ of the diazo compound is a spacer group. The terms "spacer" and "spacer group" are used herein interchangeably and refer to a group that provides a covalent linkage introducing physical distance between the cellulosic material and the functional group. Preferably, a spacer preferably does not affect the properties of the cellulosic material. Spacer groups are known in the art. Suitable spacers include, but are not limited to, branched or straight-chained, substituted or unsubstituted alkanes, alkenes or alkynes containing up to 200 carbon atoms, for example up to 100 carbon atoms, or up to 50 carbon atoms. In certain embodiments, spacers suitable for use in the context of the present invention contain between 1 and 20 carbon atoms. Generally, spacers are stable under the conditions in which the functionalized cellulosic material is used. However, it is also envisioned to use spacers that are cleavable under specific conditions (e.g., photocleavable spacers).

II—Uses of the Functionalization Reaction and of Functionalized Cellulosic Materials A functionalization method according to the present invention may be employed to functionalize a cellulosic material using any of a wide variety of desired functional groups for the purpose of modifying or improving at least one property of the cellulosic material. Properties that can be modified or improved include, for example, physical properties, such as hydrophobicity, tensile strength, tensile stiffness, color, fluorescence, and the like, and chemical properties, such as adsorption, chelation, anti-microbial activity, catalysis of chemical reaction, biodegradability in the presence of enzymes, and the like.

1. Hydrophobic Cellulosic Supports

Cellulose-based materials have a strong tendency to absorb moisture due to the high hydrophilicity of cellulose fibers. Even if this property can be interesting for certain specific uses, it can represent a major drawback when the mechanical resistance and the physical integrity of the material are degraded by humidity. This problem is particularly prevalent for paper used in packaging or as printing medium. Hydrophobization of cellulose allows to combine the advantages of natural fibers with properties of moisture resistance and repellence.

A functionalization method according to the present invention may be employed to increase the hydrophobicity of a cellulosic material. Indeed, a diazo compound may be used to functionalize a cellulosic material with a hydrophobic agent. As used herein, the term "hydrophobic agent" refers to an agent that confers hydrophobic properties to a cellulose surface onto which it is grafted, such that the cellulose surface is not easily wetted by polar solvents like water, and such that the cellulose surface exhibits a contact angle higher than 900 when contacted with a polar solvent, the angle being measured by static contact angle goniometer using the static sessile drop method. For example, in certain embodiments, the cellulose surface grafted with a hydrophobic agent exhibits a contact angle superior to about 100°, or superior to about 110°, or superior to about 120°, or yet superior to about 130°.

Examples of suitable hydrophobic agents include, but are not limited to, long linear or branched carbon chains containing more than 8 carbon atoms, steroid derivatives (e.g., cholesterol), terpene derivatives (e.g., limonene, myrcene, pinene, ocimene, and the like), silicone type derivatives (e.g., aliphatic or cyclic polysiloxanes, polydimethylsiloxane or polydimethydiphenylsiloxane or silane-based compounds such as for example alkoxysilanes and aminosilanes), fluorinated derivatives (e.g., fluoromonomers, fluorooligomers, fluoropolymers, fluorinated silanes), carbon nanotubes, manganese oxide polystyrene ($MnO_2$(PS) nanocomposite, zinc oxide polystyrene (ZnO/PS) nanocomposite, octadecylamine (ODA), and the like.

In certain embodiments, the hydrophobic agent belongs to the family of saturated fatty acids and related compounds, to the family of diterpenes, or the family of sterols. For example, the hydrophobic agent is cholesterol, palmitic acid or abietic acid.

Hydrophobic cellulosic materials obtained via such a functionalization reaction may be used in a wide variety of applications. For example, when the cellulosic material is paper or cardboard, the hydrophobic cellulosic material may find application as packaging material. As used herein the term "packaging material" refers to materials for forming packages for protecting, carrying, distributing, etc., products, such as a ream of paper, paper rolls, foods, beverages, etc. Packaging material may include, for example, ream wrap, roll wrap, envelopes, containers (e.g., for foods or beverages), boxes, etc. When the cellulosic material is fabric, the hydrophobic cellulosic material may be used, for example, in the fabrication of clothes or of health-care-related materials such as surgical drapes, sterile wraps, diapers, incontinence products, wipes, beddings, pads, and the like.

In certain embodiments, the hydrophobic agent is such that, once functionalized, the cellulosic material has a contact angle of more than 150°. Highly hydrophobic surfaces with high water repellency often have a biomimicking self-cleaning property, and in some cases antimicrobial properties as they do not hold moisture. Thus, when the hydrophobic cellulosic material obtained using such a functionalization method is fabric, it may be used for the fabrication of protective garments. As used herein, the term "protective garment" refers to water-proof garments, personal protection clothing, soldiers' uniform garments, and work wear, as well as coats, laboratory coats, pants, jackets, aprons, coveralls, and partial body single use or single use accessories, such as hoods, boot or shoe covers, sleeves, gloves, and any other clothing items that may be used to cover at least a part of the body. Protective garments may be used to avoid any unnecessary contact with hazardous material and minimize the risk of exposure. When the hydrophobic cellulosic material obtained using such a functionalization method is paper, it may find application in the development of disposable labware and lab-on-paper devices (e.g., reservoirs for liquid storage and manipulation, funnels, tips for pipettes, or accordion-shaped substrates for liquid transport or mixing), in the paper-based electronic industry (e.g., for the development of electronic sensors and chips), or in the medical and health-care industry.

2. Cellulose-Supported Catalysts

Supported catalysts are widely used to accelerate the chemical reaction rate in various applications. In the last decades, the emphasis of science and technology is shifting more towards environmentally friendly and sustainable resources and processes. Thus, polysaccharides derived from natural sources, which exhibit unique structures and functional groups, have recently garnered increased attention for their potential applicability as supports for catalysts. Several biopolymers, for example, alginate, gelatin, starch, chitosan, and cellulose, have been utilized as supports for catalytic applications.

Thus, in certain embodiments, a functionalization method according to the present invention may be employed to functionalize a cellulosic material with a catalyzing agent. The method is particularly useful for the heterogenization of transition metal complexes that are extensively used as homogeneous catalysts in organic synthesis.

Heterogenization of homogeneous catalytic complexes combines the advantages of heterogeneous catalysts (good stability and easy recycling allowing a "green" catalysis) with the advantages of their homogeneous counterparts (high activity and selectivity). In certain embodiments, a functionalization method according to the present invention is employed to functionalize a cellulosic material with a catalyzing agent in the form of a transition metal complex. In other embodiments, a functionalization method according to the present invention is employed to functionalize a cellulosic material with a ligand; and then a transition metal is complexed to the ligand grafted on the cellulosic material, such that the metal-ligand complex forms a catalyzing agent.

Transition metal-ligand complexes that can be used as catalyzing agents in the practice of the present invention are known in the art. The term "transition metal", as used herein, refers to any transition metal known to be employed in making transition metal, organometallic complex catalysts. The most commonly employed are titanium, vanadium, chromium, manganese, iron, cobalt, nickel, zirconium, molybdenum, ruthenium, rhodium, palladium, tantalum, osmium, and iridium. As used herein in the context of catalyzing agents, the term "ligand" refers to a molecule that binds to a metal atom to form a coordination complex. The bonding with the metal generally involves formal donation of one or more of the ligand's electron pairs. In the context of the present invention, a ligand may be selected among the ligands that are known to bind to a transition metal atom to form a catalyzing agent. Examples of suitable ligands include, but are not limited to, N-heterocyclic carbene (NHC) ligands (e.g., NHC imidazolidine ligands, NHC imidazole ligands, NHC thiazole ligands, NHC triazole ligands); BINOL (1,1'-bi-2-naphthol) and TADDOL (a,a,a',a'-tetraaryl-2,2-disubstituted 1,3-dioxolane-4,5-dimethanol) ligands; phosphines (e.g., dialkyl-phosphinobiphenylphosphine, amino- and imino-phosphines, neomenthyl-diphenylphosphine), phosphites (e.g., trioraganophosphites, diorganophosphites, bis-phosphites); ethylenimine ligands (e.g., ethylenediaminetetraacetic acid, tetraethylene-pentamine), poly(hydroxamic acid) ligands, and the like.

3. Other Uses

As will be recognized by one skilled in the art, the functionalization method described herein may be used to functionalize a cellulosic material with any of a wide variety of other functional groups such as for enzyme immobilization, biosensing, diagnostics, water filtration, remediation, anti-counterfeiting, covalent printing, etc.

A. Water Filtration and Remediation

As seen above, a functionalization method described herein may be used to introduce metal ligands on a cellulosic material. For example, a cellulose filter paper may be functionalized with ethylenediaminetetraacetic acid (EDTA), a chelating agent, to allow the treatment of water samples containing various heavy metal cations, including Ag(I), Pb(II), Cd(II), Ni(II), Zn(II), Sn(II), and Cu(II) (d'Halliun et al., ACS Sustainable Chem. Eng., 2017, 5: 1965-1973). Other examples of chelating agents include, but are not limited to, [4-(1,4,8,11-tetraazacyclotetradec-1-yl) methyl]benzoic acid (CPTA), cyclohexanediaminetetraacetic acid (CDTA), ethylenebis(oxyethyl-enenitrilo)tetraacetic acid (EGTA), diethylenetriaminepentaacetic acid (DTPA), citric acid, hydroxyethyl ethylenediamine triacetic acid (HEDTA), iminodiacetic acid (IDA), triethylene tetraamine hexaacetic acid (TTHA), 1,4,7,10-tetraazacyclododecane-1,4,7,10-tetra(methylene phosphonic acid) (DOTP), 1,4,8, ll-tetraazacyclododecane-1,4,8,11-tetraacetic acid (TETA), 1,4,7,10-tetraazacyclo-dodecane-1,4,7,10-tetraacetic acid (DOTA), and derivatives thereof.

Alternatively, a functionalization method may be used to functionalize a cellulosic material with an agent having a specific target binding activity, such as an antibody (or a fragment thereof), an antibody mimetic compound (e.g., affibodies, affimers and Kunitz domains), an aptamer or any other selective-binding polypeptide. A functionalization method may also be used to functionalize a cellulosic material with a sensor function, for example to detect nucleic acids, viruses, micropollutants or high value products.

Another example of sensor functions includes quinine for the adsorption of heavy metals, such as Cd(II), in water (Aka et al., J. Environ. Sci., 2019, 84: 174-183); ethylenediamine or spermine for the adsorption of heavy metals (Nongbe et al., *Cellulose,* 2018, 25: 4043-4055).

A cellulosic paper functionalized with a metal ligand or another specific ligand may have many uses, including filtration, adsorption and water treatment. In particular, such paper membranes may be used to filter a liquid to remove micro-pollutants, such as heavy metals, radionuclides, environmental pollutants, toxins, antimicrobial agents (in particular antibiotics) or estrogen-disrupting hormones. In addition, such membranes could be used for remediation of high value products, such as gold and heavy metals, in waste streams or in the environment. Alternatively, the paper membranes can be used for specific capture of high value products in the biotechnology industry, such as pharmaceutical products, biological products or recapture of catalytic compounds for reuse.

It is also envisioned that a functionalized cellulosic material may be used for kidney or liver dialysis applications, removing toxins from the blood or other body fluids either ex vivo or in vitro.

B. Sensing, Biosensing and Diagnostics

A functionalization method described herein may be used to introduce a sensing moiety or a diagnostic agent on a cellulosic material. The terms "sensing moiety", "sensor function" and "sensing agent" are used herein interchangeably and refer to a molecule or biochemical molecule or fragment thereof that is capable of specifically interacting or binding with an analyte of interest in a sample. The interaction and/or the binding between the sensing moiety and the analyte of interest can be direct or indirect. For example, the sensing moiety may bind to the analyte of interest via a crosslinker. In certain embodiments, the binding between the sensing moiety and the analyte provides one or more detectable signals.

Sensing moieties are known in the art. Examples of sensing moieties (or sensor functions) have been described above. Other examples of sensing moieties include, but are not limited to, thioglycolic acid, which when covalently bound to a cellulose paper allows the reduction of Cu(II) in seconds and the formation of deeply colored complexes onto the cellulose paper thereby allowing the detection of copper in water samples (Rull-Barrull et al., Chem. Commun., 2016, 52: 6569-6572), and heptylmannose, which has been reported to be useful in the binding and specific detection of pathogenic *E. coli* (Cauwel et al., Chem. Commun., 2019, 55: 10158-10165). Other examples of suitable sensing agents include antimicrobial peptides (AMPs). Antimicrobial peptides are a group of biomolecules that have evolved to recognize and kill target microbes by binding to and disrupting cell membranes.

Several unique characteristics of antimicrobial peptides make them extremely attractive alternatives to antibodies for detection of microbial biothreats: resistance to proteases, stability to environmental extremes, high affinity, overlapping (but not identical) binding reactions with microbial membranes and membrane components. Arrays of antimicrobial peptides have been used to detect and classify microbial pathogens with similar or superior sensitivity to antibody-based assays; their broad-spectrum binding activities also provide the potential for detection of unknown (or unsuspected) microbes. Another example is a rhodamine-based sensor, which when covalently bound to cellulose paper, constitutes a portable, recyclable and highly selected paper-based sensor device for the colorimetric and optical detection of hydrogen sulfate anions in water (Rull-Barrull et al., *Chem. Comm.,* 2016, 52: 2525-2528).

As used herein, the term "diagnostic agent" refers to a sensing moiety used in a method of detection of an analyte of interest in a biological sample obtained from a subject, wherein the presence of the analyte of interest in the biological sample is indicative of the presence and/or progression of a disease or medical condition in the subject.

Examples of diagnostic agents include, but are not limited to, agents that specifically associate with cells (e.g., one or more particular types of cells that are indicative of a particular disease and/or particular state of a cell, tissue, and/or subject), nucleic acids (such as a DNA, RNA, or modified derivatives thereof), proteins (such as extracellular proteins, receptors, tumor-markers, transmembrane proteins, enzymes, antibodies), carbohydrates (such as monosaccharides, disaccharides, or polysaccharides). In certain embodiments, the diagnostic agent may be a small molecule mimic of a target ligand (e.g., a peptide mimetic ligand), a target ligand (e.g., an RGD peptide-containing peptide or folate amide), or an antibody or antibody fragment specific for a particular target. In some embodiments, a diagnostic agent is an aptamer designed to associate with or bind to a target of interest.

C. Covalent Printing

Paper remains the main material for applications such as wrapping, labeling and banknotes fabrication. In these applications, the commonly used printing techniques (notably by inkjet) do not provide a sufficient level of protection against counterfeiting (i.e., the falsification of banknotes and documents of value, as well as the imitation of items such as clothing, handbags, watches, and the like). Covalent printing differs from inkjet printing processes in that small molecules are covalently linked to cellulose. This technique makes it possible to reach a higher level of security by offering a marking having an increased stability.

Thus, a method described herein may be used to functionalize a cellulosic material (e.g., paper or fabric) with a printing agent (i.e., a group playing the role of an ink). The method provides a cellulosic material functionalized by a printing agent covalently bonded to the cellulose, i.e., in a more stable manner than those proposed in the prior art. As used herein, the term "printing agent" refers to a compound that leads to a visually or spectroscopically detectable labeling. The printing agent may be detectable at wavelengths corresponding to the visible domain (400-700 nm), to the ultraviolet (UV) domain (200-400 nm), or to the infrared (IR) domain (700 nm-1 mm, generally the near infrared (NIR) domain (700-2500 nm)), or it may be detectable under the effect of a stimulus such as for example a change in polarity or a change in pH or a change in temperature. When the printing agent is a photoactive agent it may be selected among fluorophores, chromophores, or a photochromophores.

Examples of fluorophores include, but are not limited to, xanthene derivatives (such as fluorescein, rhodamine, Oregon green, eosin and Texas red); cyanine derivatives (such as cyanine, indocarbocyanine, oxacarbocyanine, thiacarbocyaning, and merocyanine); squaraine derivatives and ring-substituted squaraines; naphthalene derivatives (such as dansyl and prodan derivatives); coumarin derivatives; oxadiazole derivatives (such as pyridyloxazole, nitrobenzoxadiazole and benzoxadiazole); anthracene derivatives (such as anthraquinones); pyrene derivatives (such as cascade blue, and the like); oxazine derivatives (such as Nile red, Nile blue, cresyl violet, oxazine 170, and the like); acridine derivatives (such as proflavine, acridine orange, acridine yellow, and the like); arylmethine derivatives (such as auramine, crystal violet, malachite green); tetrapyrrole derivatives (such as porphin, phthalocyanine, bilirubin, and the like).

Other examples of luminescent compounds include, but are not limited to, polycyclic aromatic compounds, such as those comprising a perylene diimide ring (known as peridinaphthalene bis-diimide, perilene or dibenz[a,h]anthracene); linear conjugate systems such as polyparaphenylene/arylene; planar benzene systems such as rubrene, coumarinic dyes; and metalloorganic compounds containing iridium (Ir), boron (B), aluminum (Al) or platinum (Pt) (for example BODIY, i.e., dipyrromethene-boron; Alq3 i.e. tris (8-hydroxylquinoline) aluminum), and of other metals such as Ru and Cu. An inorganic luminescent compound can consist of rare earth doped metal oxide nanoparticles (for example, zirconium oxide, yttrium oxide, zinc oxide, copper oxide, lanthanum oxide, gadolinium oxide, praseodymium oxide, etc. and their combinations, which are doped with rare earths such as lanthanum, cerium, praseodynium, neodymium, samarium, europium, gadolinium, terbium, dysprosium, holmium, erbium, and their combinations); metallic nanoparticles (e.g., gold, silver, platinum, palladium, iridium, rhenium, mercury, ruthenium, osmium, copper, nickel, and combinations thereof); semiconductor nanoparticles, for example, group II-VI semiconductors, group III-V, Group IV, Groups I-VIII, their alloys and mixtures (e.g., ternary or quaternary mixtures) and combinations thereof.

In certain embodiments, the printing agent is a photochromic entity (see for example, Bretel et al., ACS Appl. Polym. Mater., 2019, 1(5): 1240-1250). The terms "photochromic entity" and "photochromic motif" are used herein interchangeably and denote a molecule which can transform reversibly between two states or isomers, A and B, having different absorption spectra, the transformation being induced in a direction or in both directions by absorption of electromagnetic radiation. The spectral change produced is generally, but not necessarily, a visible change in colors. The terms 'switch-on' and 'switch off' are sometimes used to denote the two directions of the photochromic reaction, and the photochromic molecules are then called "photoswitches" or "molecular switches". Suitable photochromic entities may be selected from the group consisting of diarylethenes (in particular dithienylethenes), spiropyranes, spirooxazines, fulgides, fulgimides, stilbenes, aromatic azo compounds (in particular azobenzenes, aminoazobenzenes, and pseudostilbenes), polycyclic quinones, benzopyranes, naphthopyranes, spirodihydroindolizines, permidinespiro-cyclohexadienones, viologenes, triarylmethanes, and anils.

Cellulosic materials functionalized with a printing agent using a method according to the present invention may be used as security elements or in the fabrication of security elements. As used herein, the term "security element" refers to any element that can be applied to an article, or be incorporated into an article, or even used to make an article, so as to make possible the identification or authentication of said article and/or to protect said article against imitation, falsification or counterfeiting. Examples of security elements include, but are not limited to, security bands, strips or ribbons, security sheets, security papers, safety boards, security patches, security labels, and security transfers.

For example, cellulosic paper functionalized with a printing agent may be used in the fabrication of fiduciary items (such as bank notes, bank checks, traveler's checks, bank cards, credit cards and other payment cards, stocks, bonds, etc.), official documents (such as diplomas, ownership certificates, registration documents, etc.), identifiers (such as customer or loyalty cards, health cards, smart cards, company identifiers, membership identifiers, service cards, subscription cards, etc.), transport tickets, access cards, lottery tickets, tickets for a cultural or sporting event, tax stamps, labels for brand authentication, tamper-evident labels, seals, and the like.

Cellulosic fabric functionalized with a printing agent may be used m the fabrication of labels for product identification and for brand authentication.

D. Other Functional Groups

The functionalization method described herein may be used to functionalize a cellulosic material with natural or synthetic phenols that are known to confer antioxidant properties and/or bacteriostatic properties. The antioxidant and antimicrobial property of paper is, for example, of interest from the viewpoint of food preservation.

Cellulosic materials functionalized using a method according to the present invention, in particular functionalized cellulosic fabrics, may find use in wound dressing, including dressing with moisture retaining properties, with anti-inflammation or pro-healing ligands attached as functionalizing agents that can serve to improve the body's own immune and healing response.

Controlling the undesirable effects of microorganisms on textiles is becoming an important issue, especially within the medical textile industry. Thus, it is crucial to impart antimicrobial activity to textile materials in order to protect the user from microorganisms' contamination. Another aspect of antimicrobial functionalization of textiles is to add a therapeutic value to the material, intended for example, for wound healing. Thus, functionalization method according to the present invention may be used to functionalize a cellulosic fabric with an antimicrobial agent, for example selected from the group consisting of inorganic salts, organometallics, iodophors (substances that slowly release iodine), phenols and thiophenols, antibiotics, heterocyclics with anionic groups, nitro compounds, ureas, formaldehyde derivatives, and amines. The invention will be further illustrated by the following examples.

EXAMPLES

The following examples describe some of the preferred modes of making and practicing the present invention. However, it should be understood that the examples are for illustrative purposes only and are not meant to limit the scope of the invention. Furthermore, unless the description in an Example is presented in the past tense, the text is not intended to suggest that experiments were actually carried out or data were actually obtained.

Example 1

Materials and Methods

Methods. The chemical functionalization of pristine cellulose fabric with diazo compound 1 (ethyl 2-cyano-2-diazoacetate) was selected as benchmark reaction to optimize the level of grafting (LG) through the variation of experimental conditions. In the standard procedure, a piece of fabric (30 mg, about 1 cm2) immersed in a solution of $Rh_2(OAc)_4$ (1 mol %) was treated with a solution of ethyl 2-cyano-2-diazoacetate 1 (3-9 equivalents per glucose unit). After the required time for grafting, the piece of fabric was thoroughly washed with ethanol (EtOH), acetone, and dichloromethane (DCM) to remove any unreacted diazo 1 and residual rhodium complex and stored under argon. The same protocol was used with cellulose paper, except that cellulose paper was beforehand submitted to a step of activation (mercerization) in an aqueous solution of NaOH to obtain mercerized paper. Furthermore, after preparation, the functionalized paper was dried through the action of a nitrogen flow and stored under argon.

The level of grafting was assessed by elemental analysis. A screening of different solvents (dichloromethane ($CH_2Cl_2$), dichloroethane ($ClCH_2CH_2Cl$), acetonitrile ($CH_3CN$), benzene ($C_6H_6$), and toluene ($C_6H_5$—$CH_3$)) was initially carried out for 1 hour at both room temperature and refluxing conditions using $Rh_2(OAc)_4$ as catalyst and 3 equivalents of diazo compound 1.

When the functionalization method was carried out in the presence of a photochemical activation, the reaction mixture was irradiated with an irradiation source of the desired wavelength for the whole duration of the functionalization reaction.

Results and Discussion

Diazo compounds are a class of highly reactive compounds with general formula:

$$R^1R^2C{=}N_2.$$

They are considered as carbene or metal carbenoids equivalents after the release of $N_2$ (Regitz et al., *Diazo Compounds: Properies and Synthesis*. Elsevier: 1986). With the exception of diazomethane, aliphatic diazo compounds (wherein $R^1$ and $R^2$ are alkyl groups) are rarely exploited in synthesis because they are generally too unstable and are potentially explosive (Hecht et al., Tetrahedron Lett., 1973, 14: 1397-1400). By contrast, diazo compounds stabilized by electron-withdrawing substituents (wherein $R^1$ and $R^2$ are independently selected from ketones, esters, nitriles, sulfones, phosphonates and aromatic rings) can be safely handled and even purified by chromatography (Hock et al., Chem. Eur. J., 2018, 24: 10571-10583). Stable diazo compounds are very appealing and popular reagents because they display a large spectrum of reactivities and, as carbene equivalents, they are prone to insert into C—H or X—H bonds (wherein X is Si, N, S or 0) (Ye et al., Chem. Rev., 1994, 94: 1091-1160; Davies et al., Chem. Rev., 2003, 103: 2861-2904; Zhang et al., Tetrahedron, 2008, 64: 6577-6605; Doyle et al., Chem. Rev., 2010, 110: 704-724; Ford et al., Chem. Rev., 2015, 115: 9981-10080; Ciszewski et al., Org. Biomol. Chem., 2019, 17: 432-448). The use of diazo compounds offers a number of benefits in the context of green chemistry. Indeed, transformations using diazo compounds are often associated with simple experimental conditions, requiring no additives such as base or ligand and $N_2$ is the only released by-product.

Effects of Solvent, Temperature, Reaction Time and Molar Ratio. The results obtained are presented in Table 1.

A screening of different solvents was carried out for a reaction of 1 hour at room temperature and under refluxing conditions using $Rh_2(OAc)_4$ as catalyst and 3 equivalents of diazo compound 1. From the set of the 5 solvents selected for their compatibility with diazo compounds, no significant differences were observed.

In general, the grafting occurred slightly better under refluxing conditions irrespective of the solvent used. Under refluxing conditions, toluene proved to be the most suitable solvent as the level of grafting (LG) reached 12.5% after 1 hour at 100° C., meaning that an average of 1 alcohol function was grafted every 8 glucose units.

Increasing the reaction time from 1 to 2 hours did not modify the LG (see entries 11-12 of Table 1). Interestingly, a significant level of grafting occurred after only 1 minute (6%) and after 10 minutes of contact the LG only marginally increased.

TABLE 1

Optimization of the covalent grafting of cellulose (under the form of fabric) with diazo compound 1.

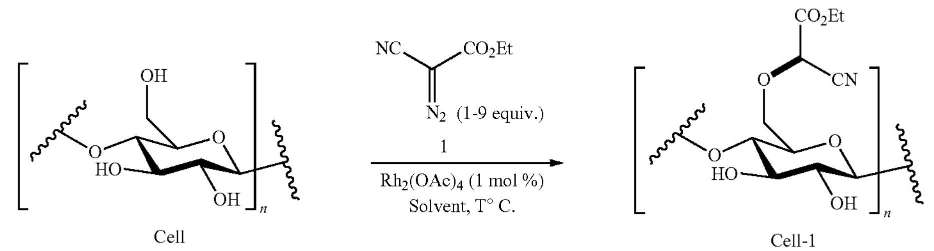

Cell

Cell-1

| Entry | Solvent | Temperature (° C.) | Time | Diazo 1 (equiv.) | LG (%) |
|---|---|---|---|---|---|
| 1 | $CH_2Cl_2$ | 25 | 1 h | 3 | 9 |
| 2 | $CH_2Cl_2$ | 40 | 1 h | 3 | 8.5 |
| 3 | $ClCH_2CH_2Cl$ | 25 | 1 h | 3 | 6 |
| 4 | $ClCH_2CH_2Cl$ | 80 | 1 h | 3 | 7 |

TABLE 1-continued

Optimization of the covalent grafting of cellulose (under the form of fabric) with diazo compound 1.

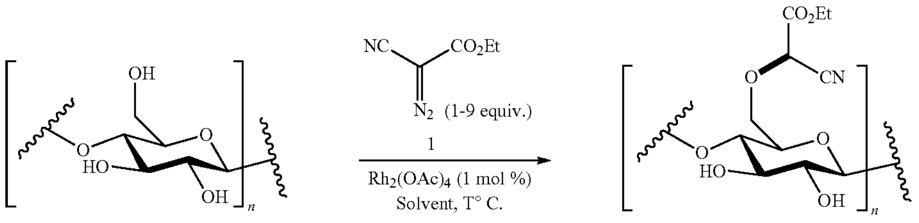

Cell

Cell-1

| Entry | Solvent | Temperature (° C.) | Time | Diazo 1 (equiv.) | LG (%) |
|---|---|---|---|---|---|
| 5 | $CH_3CN$ | 25 | 1 h | 3 | 6 |
| 6 | $CH_3CN$ | 80 | 1 h | 3 | 8.5 |
| 7 | $C_6H_6$ | 25 | 1 h | 3 | 8 |
| 8 | $C_6H_6$ | 80 | 1 h | 3 | 9 |
| 9 | $C_6H_5$—$CH_3$ | 25 | 1 h | 3 | 8 |
| 10 | $C_6H_5$—$CH_3$ | 100 | 1 h | 3 | 12 |
| 11 | $C_6H_5$—$CH_3$ | 100 | 2 h | 3 | 12 |
| 12 | $C_6H_5$—$CH_3$ | 100 | 30 min | 3 | 11 |
| 13 | $C_6H_5$—$CH_3$ | 100 | 10 min | 3 | 10 |
| 14 | $C_6H_5$—$CH_3$ | 100 | 1 min | 3 | 6 |
| 15 | $C_6H_5$—$CH_3$ | 100 | 10 min | 1 | 7.5 |
| 16 | $C_6H_5$—$CH_3$ | 100 | 10 min | 9 | 8 |

Finally, the number of equivalents of diazo compound 1 per glucose unit used in this process was also varied but neither a decrease from 3 equivalents to 1 equivalent, nor an increase from 3 equivalents to 9 equivalents improved the level of grafting.

Effects of Diazo Compound. Having optimized the experimental conditions with diazo compound 1, several diazo compounds were used for grafting on the cellulose backbone:

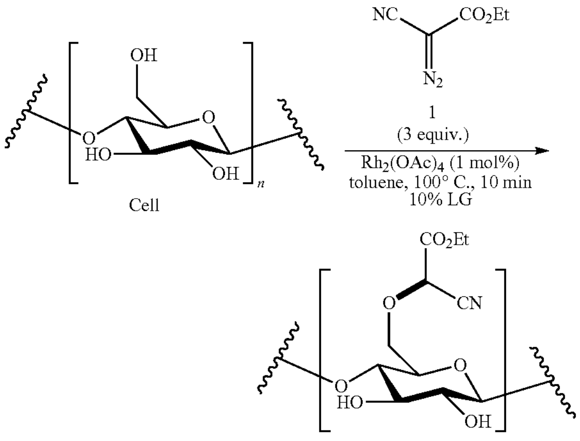

Cell

Cell-1

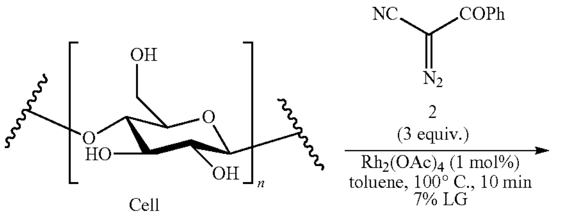

Cell

-continued

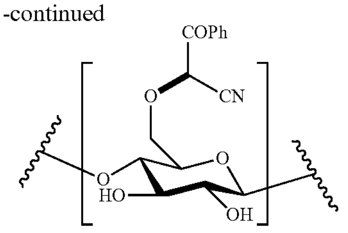

Cell-2

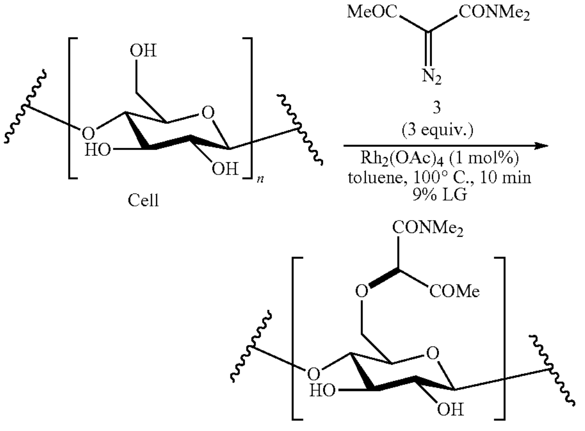

Cell

Cell-3

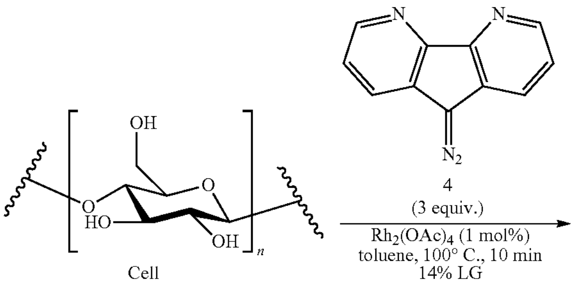

Cell

-continued

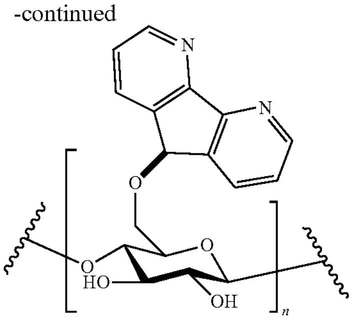

Cell-4

Figure 2:
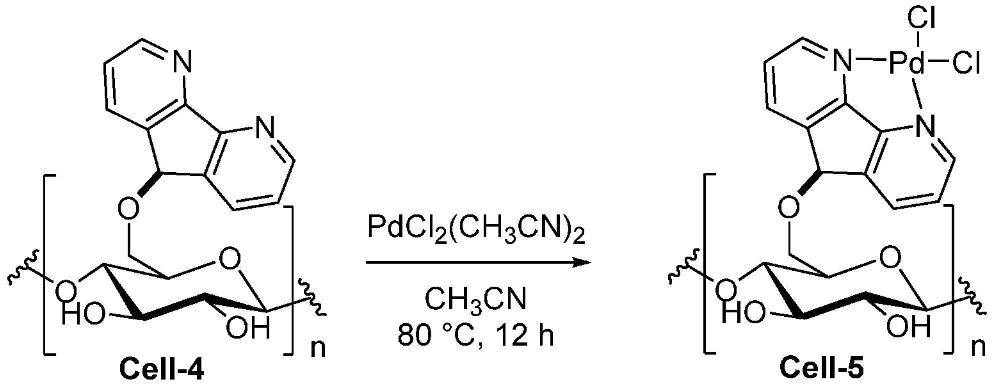
FIG. 2. Reaction of complexation of palladium by grafted cellulose Cell-4, leading to the formation of complex Cell-5.

The results obtained revealed several interesting features. First, irrespective of the diazo compound used, good levels of grafting were obtained, in the range of 7 to 14%. These values are in the ideal range to introduce a significant modification in the physical properties of the cellulosic material without compromising its physical integrity and strength. The present Inventors recently showed that a level of grafting exceeding 25% significantly weakens the cellulosic material due to a loss of fibers cohesion, ultimately leading to cellulose solubilization in organic solvents (Nongbe et al., *Cellulose,* 2018, 25: 1395-1411). Second, many functional groups such as ketone, nitrile, ester and amide were well tolerated thereby allowing subsequent functionalization. Third, the cellulose functionalization reaction worked well with diazo compounds lacking electron-withdrawing groups such a ketone and nitriles. For instance, it was possible to efficiently graft 4,5-diazafluorene moieties to cellulose (Cell-4). This result opens the door to interesting perspectives towards the preparation of new ligands. For example, the ability of Cell-4 to act as a ligand for palladium was demonstrated with the preparation of complex Cell-5 (see FIG. 2).

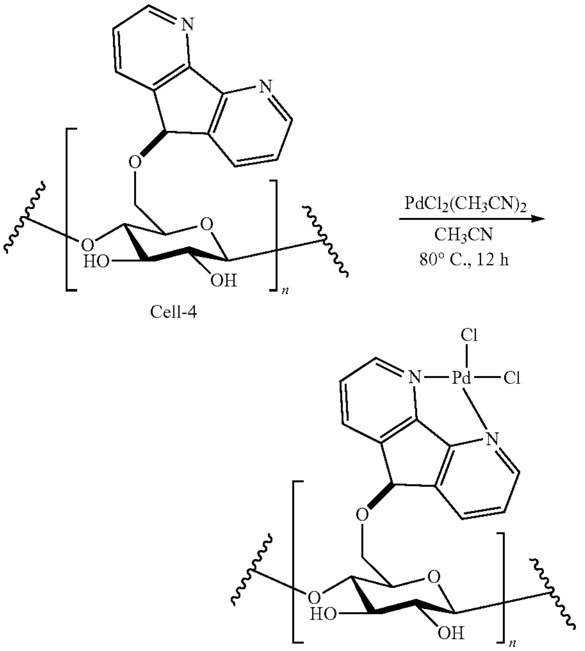

Cell-4

Cell-5

Use of Photochemical Activation instead of Rhodium Catalysis. The grafting tests of cellulose using diazo compound 1 on 100% cellulose paper or fabric were carried out using photochemical activation to replace rhodium catalysis all the other parameters remaining identical (toluene was used as solvent, 1 equivalent of the diazo compound 1 was employed, the reaction was carried out at 25° C.). The results obtained are presented in Table 2.

TABLE 2

Reaction of functionalization of cellulose with diazo compound 1 in the absence of rhodium catalysis, but in the presence (entries 1-6) or absence (entry 7) of photochemical activation.

| Entry | Bulk Cellulose | Photochemical Activation | Time | LG (%) |
|---|---|---|---|---|
| 1 | fabric | UV 254 nm | 10 minutes | 12 |
| 2 | fabric | UV 365 nm | 10 minutes | 12 |
| 3 | fabric | Xenon | 10 minutes | 12 |
| 4 | paper | UV 365 nm | 15 minutes | 15 |
| 5 | paper | UV 254 nm | 15 minutes | 19 |
| 6 | paper | UV 254 nm | 10 minutes | 11 |
| 7 | paper | No light | 15 minutes | 13 |

The influence of the irradiation wavelength on the grafting rate is quite negligible. Paper and fabric react quite similarly and lead to comparable grafting levels. The grafting level is optimal at 15 minutes. More surprisingly, in the absence of light (and of rhodium(II) catalyst), the reaction was observed to also work.

Example 2

Figure 3:
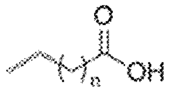
FIG. 3. Chemical structures and names of the nine starting substrates used in the synthesis of diazo hydrophobic inks.
Figure 3:
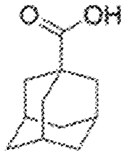
Figure 3:
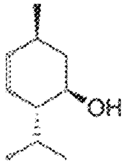
Figure 3:
Figure 3:
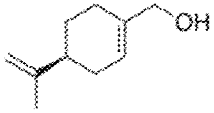
Figure 3:
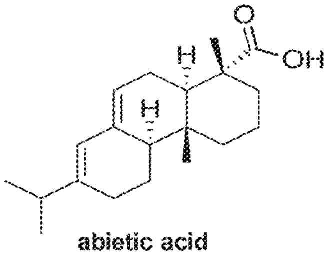
Figure 3:
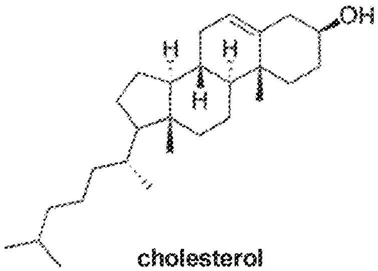

In order to provide a biodegradable and/or recycle material, which can be biocompatible, diazo hydrophobic inks were obtained from products that are bio-based and considered to safe enough for the body. Three compounds were selected as raw materials for the preparation of diazo hydrophobic inks. These three compounds belong to three different families: saturated fatty acids and related compounds, diterpenes and sterols (see FIG. 3).

From these natural compounds, a synthetic strategy has been developed to produce diazo hydrophobic inks. This strategy is presented in the scheme below.

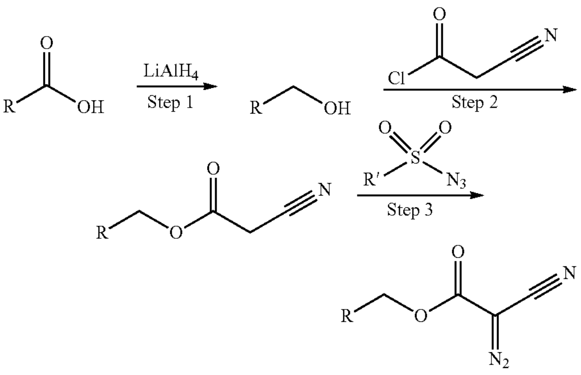

The three diazo hydrophobic inks were synthesized according to this strategy, and the global yield measured for the synthesis of each of the compounds is presented in Table 3 below.

TABLE 3

| Global synthetic yield for each of the three diazo hydrophobic inks. | | | | |
|---|---|---|---|---|
| Starting compound | Yield (%) Step 1 | Yield (%) Step 2 | Yield (%) Step 3 | Global Yield (%) |
| Saturated Fatty Acids and Related Compounds | | | | |
| Palmitic acid | 96 | 97 | 81 | 75 |
| Diterpenes | | | | |
| Abietic acid | 92 | 74 | 97 | 66 |
| Sterols | | | | |
| cholesterol | — | 93 | 94 | 87 |

After preparation, each of the diazo hydrophobic inks was submitted to a grafting reaction on cellulose according to an OH insertion strategy. As shown in the following reaction scheme, this grafting reaction involves cellulose, the diazo compound (hydrophobic ink) and a base to "activate" the cellulose (mercerization).

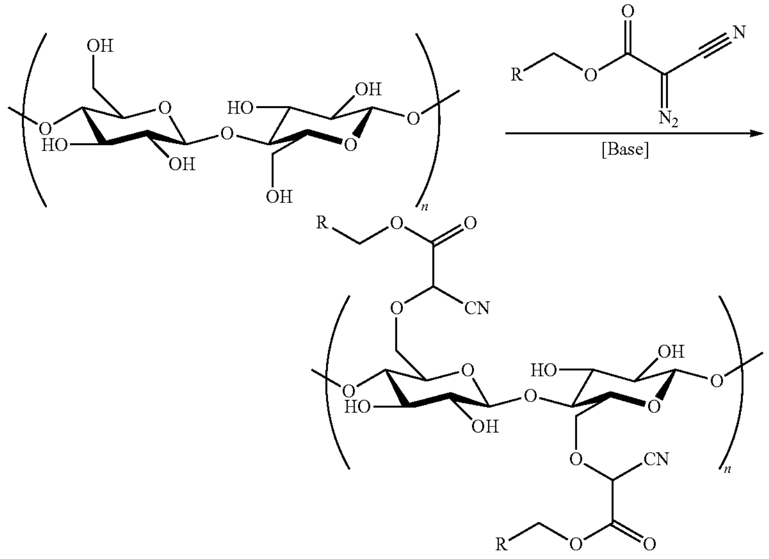

The characteristics of the different grafting reactions carried out are presented in Table 4 below.

TABLE 4

| Global synthetic yield for each of the three diazo hydrophobic inks. | | | |
|---|---|---|---|
| | | Grafting level (τ) | |
| Starting Compound | Hydrophobia* | [NaOH] 2M | [NaOH] 4M |
| Saturated Fatty Acid and Related Compoundss | | | |
| Palmitic acid | Yes | 3.35 | 5.68 |
| Diterpenes | | | |
| Abietic acid | Yes | 3.35 | 4.25 |
| Sterols | | | |
| cholesterol | Yes | 5.10 | 9.67 |

Figure 4:
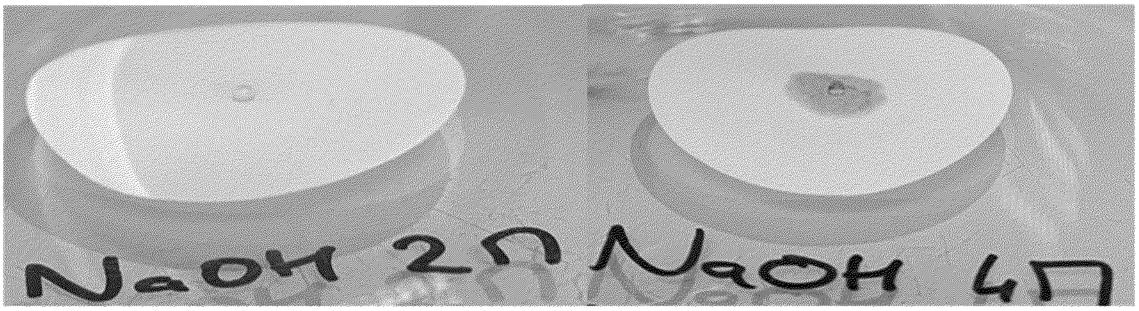
FIG. 4. Pictures of cellulosic material after grafting with (A) cholesterol using NaOH 2M (left) or NaOH 4 M (right), or with (B) palmitic acid using NaOH 2M (left) or NaOH 4 M (right), or with (C) abietic acid using NaOH 2M (left) or NaOH 4 M (right).
Figure 4:
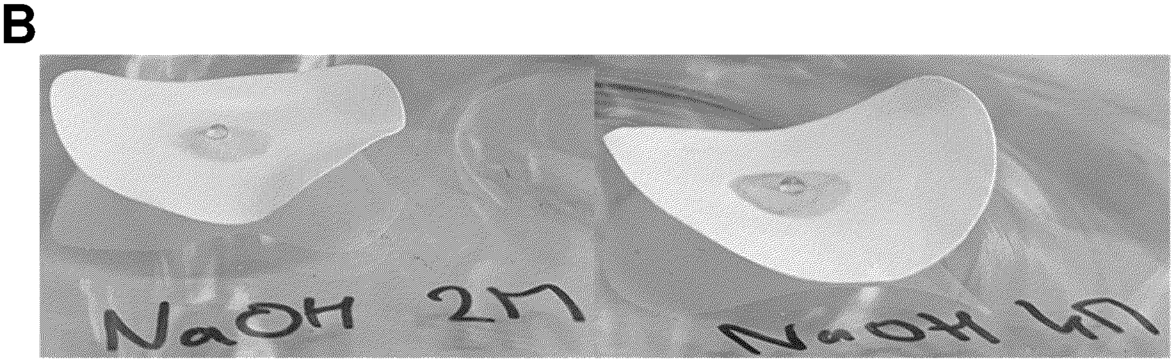
Figure 4:
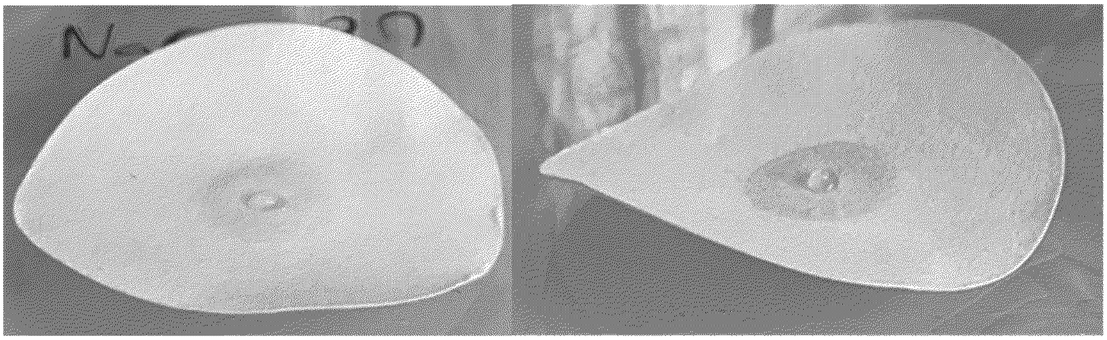

The hydrophobicity of cellulosic materials grafted with a diazo compound obtained from cholesterol, palmitic acid and abietic acid is illustrated in the pictures presented in FIGS. 4(A), 4(B) and 4(C), respectively.

What is claimed is:

1. A method for functionalizing a cellulosic material, comprising a step of:

contacting said cellulosic material with a diazo compound to obtain a functionalized cellulosic material, wherein the diazo compound is stabilized by at least one electron-withdrawing group and has general formula $R'R^2C{=}N_2$, wherein $R^1$ and $R^2$ are substituents independently selected from acyl, aldehyde, amide, ester, nitrile, nitro, sulfonyl and aryl groups, or wherein $R^1$ is selected from acyl, aldehyde, amide, ester, nitrile, nitro, and sulfonyl groups and $R^2$ is a hydrogen or an alkyl group, or $R^1$ is selected from aryl groups and $R^2$ is an alkyl group, or wherein the diazo compound has general formula:

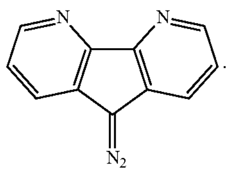

4

2. The method according to claim 1, wherein the cellulosic material is a mercerized cellulosic material.

3. The method according to claim 1, wherein the functionalization takes place via formation of an ether linkage.

4. The method according to claim 1, wherein the cellulosic material is in the form of fabric, paper or cardboard.

5. The method according to claim 1, wherein the cellulosic material comprises pristine cellulose.

6. The method according to claim 1, wherein the cellulosic material consists of pristine cellulose.

7. The method according to claim 1, wherein the diazo compound stabilized with at least one electron-withdrawing group has one of the following formula:

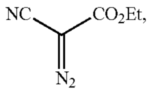

1

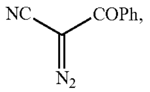

2

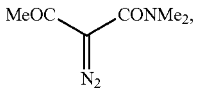

3

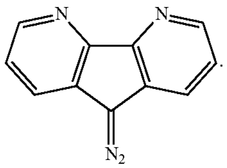

4

8. The method according to claim 1, wherein the functionalization takes place in a solvent selected from the group consisting of non-polar solvents, polar aprotic solvent, and any combination thereof.

9. The method according to claim 1, wherein the functionalization takes place at a temperature comprised between room temperature and reflux temperature.

10. The method according to claim 1, wherein the functionalization takes place in the presence of a rhodium (II) carboxylate used as catalyst or in the presence of a photochemical activation.

11. The method according to claim 1, wherein the functionalization takes place in the absence of a catalyst and in the absence of any photochemical activation.

12. The method according to claim 1, wherein said method is for functionalizing a cellulosic material with a functional group selected from the group consisting of: hydrophobic agents, catalyzing agents, sensing agents, diagnostic agents, printing agents, chelating agents, ligands, antioxidants, antimicrobial agents, and drugs, wherein $R^1$ or $R^2$ is said functional group or each of $R^1$ and $R^2$ is said functional group, or wherein said method further comprises a step of modifying, with said functional group, the functionalized cellulosic material obtained by contacting the cellulosic material with the diazo compound.

13. The method according to claim 12, wherein the hydrophobic agent belongs to the family of saturated fatty acids, to the family of diterpenes, or the family of sterols, or wherein the hydrophobic agent is 1-adamantanecarboxylic acid.

14. The method according to claim 13, wherein the hydrophobic agent is selected from the group consisting of cholesterol, palmitic acid and abietic acid.

15. The method according to claim 1, further comprising a step of using the functionalized cellulosic material for the fabrication of one of: a hydrophobic cellulosic material, a packaging material, a cellulose-supported catalyst or a security element.

16. The method according to claim 1, further comprising a step of using the functionalized cellulosic material obtained in the fabrication of an item useful in packaging, in catalyst, in filtration, adsorption and water treatment, in remediation, in medicine, in anti-counterfeiting, in paper-based electronics or in the fabrication of clothes, protective garments, health-care materials, medical devices, fiduciary items, official documents, or identifiers.

* * * * *